Jan. 2, 1968     W. W. BINTZER     3,361,273
METHOD AND MEANS FOR SEGREGATION OF SCRAP METAL
Original Filed March 21, 1963     3 Sheets-Sheet 1

INVENTOR
WILLIAM W. BINTZER
BY Mason, Mason & Albright
ATTORNEYS

Jan. 2, 1968    W. W. BINTZER    3,361,273
METHOD AND MEANS FOR SEGREGATION OF SCRAP METAL
Original Filed March 21, 1963    3 Sheets-Sheet 2

INVENTOR
WILLIAM W. BINTZER

BY Mason, Mason & Albright
ATTORNEYS

United States Patent Office 3,361,273
Patented Jan. 2, 1968

3,361,273
METHOD AND MEANS FOR SEGREGATION OF SCRAP METAL
William W. Bintzer, Malvern, Pa., assignor to Lukens Steel Company, Coatesville, Pa., a corporation of Pennsylvania
Continuation of application Ser. No. 266,945, Mar. 21, 1963. This application July 14, 1965, Ser. No. 480,222
13 Claims. (Cl. 214—10.5)

This application is a continuation of application Ser. No. 266,945, filed Mar. 21, 1963, now abandoned.

This invention relates to the organizing of a steel scrap yard into variable divided areas for the segregation of scrap metal according to gradation. More particularly, the invention relates to the use of specially designed concrete block dividers to enlarge the capacity of scrap metal yards and to improve the function of such yards insofar as the efficient use of space and the effective segregation of various grades and types of scrap metal are concerned.

Closely controlled segregation of scrap permits a control of alloys produced therefrom whereby improved alloy steels may be produced which have superior characteristics over similar alloys produced by standard techniques made from pig iron and alloying additives.

In the steel producing industry, it is the usual practice to use scrap steel to be reprocessed and made into new steel. In order to make effective use of scrap steel, it is necessary that it be segregated in accordance with its type and composition. As a general rule, the scrap steel is sold to the plant in its segregated condition and a spot check will be generally made by the use of a portable spectrograph of the various batches. In the present state of the art, these batches are then placed in segregated piles about the scrap yard. When a particular type of scrap is required for the furnaces, it is generally transported by an overhead gantry which overrides the scrap yard to other transportation means which carry the scrap to a nearby furnace.

Scrap steel is literally dumped in ton lots into the scrap yard. For this reason it has been found impracticable to provide barriers to aid in the segregation of the scrap and to make more effective use of the yard space. Such barriers have been considered either too expensive or constantly in the need of repair. One practice, however, has been to divide the scrap yard by the provision of pits and surrounding dirt barriers. This, it has been found, does allow a more effective use of the yard provided that the quantities of the various gradations of scrap do not vary appreciably from time to time. However, when a purchase has been made of a large amount of steel scrap of one type, such a yard is unsuitable where the pit for that particular gradation is inadequate for the type of steel scrap purchased. Since prices of scrap fluctuate widely from time to time, it is not generally wise to delimit the area in which a particular type of steel is kept if this can be avoided. However, if it is not well segregated, it becomes difficult, if not impossible to produce the consistently improved steel which is otherwise possible.

It has occurred to the inventor that by using concrete block dividers having a low center of gravity and incorporating means so that same may be moved from one location to another, the steel scrap yards might be better organized in order to make maximum use of the space within the yard and improve the maintenance of various types of steel in the required segregated conditions. Upon putting this concept into practice, it has been found that the effective capacity of the scrap yards is virtually doubled, that the segregation of the various types of steels is, in fact, significantly improved, and further, that with a given amount of scrap steel, the travel required of the overhead gantry to supply steel for the furnaces is approximately cut in half. Moreover, it has been found out that the barriers stand up better than had been expected and can be replaced without any undue difficulty when they become no longer usable due to the continuous shocks, wear and tear encountered in the scrap yard.

It is thus an object of the present invention to provide in the process of making variable divided areas for segregation of scrap metal according to gradation in a steel scrap metal yard, a movable concrete block divider, which can absorb the punishment of the scrap yard, can be easily and cheaply manufactured, will not tip over and at the same time will provide effective barriers for the scrap, and which can be readily moved by an overhead gantry or crane.

It is a further object of the present invention to provide a strong barrier of the type involved which can be used in combination with like barriers to form various patterns of segregated areas in a scrap steel yard, wherein the various barriers can be placed edge to edge in a plurality of angular relationships.

Other objects, adaptabilities, and capacities of the invention will appear as the description progresses, reference being had to the accompanying drawings in which.

Figure 12:
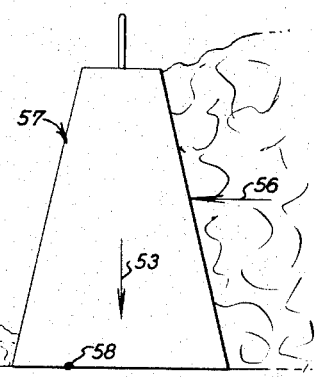
Figure 11:
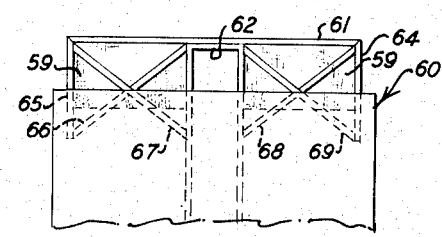
Figure 13:
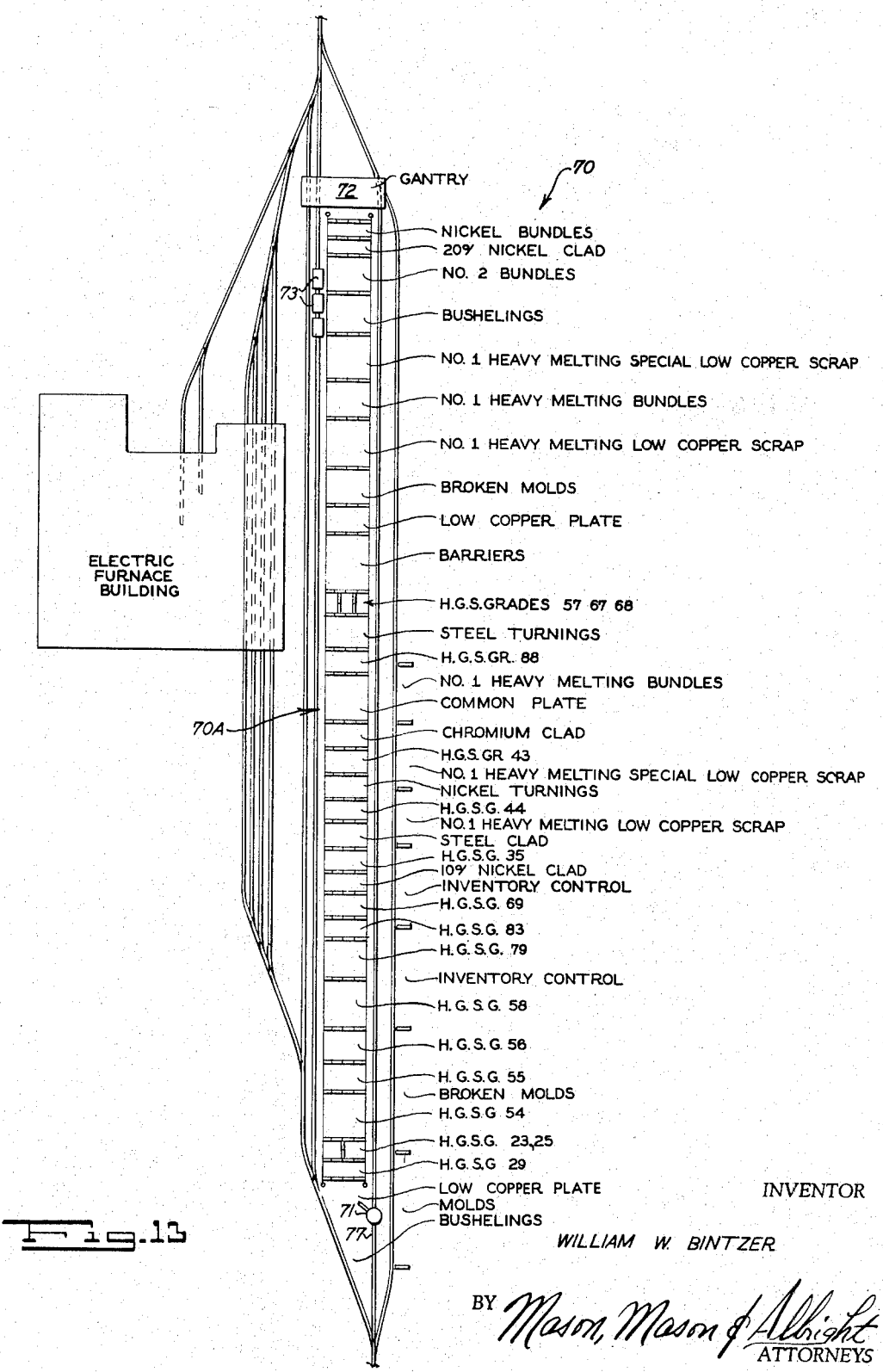

FIG. 11 discloses a further modification of the divider block wherein the height of the barrier is extended by means of a wire mesh;

FIG. 12 is a diagrammatic view showing substantially all of the scrap on one side of the divider block; and FIG. 13 shows a typical scrap yard disposed along railroad tracks.

Figure 1:
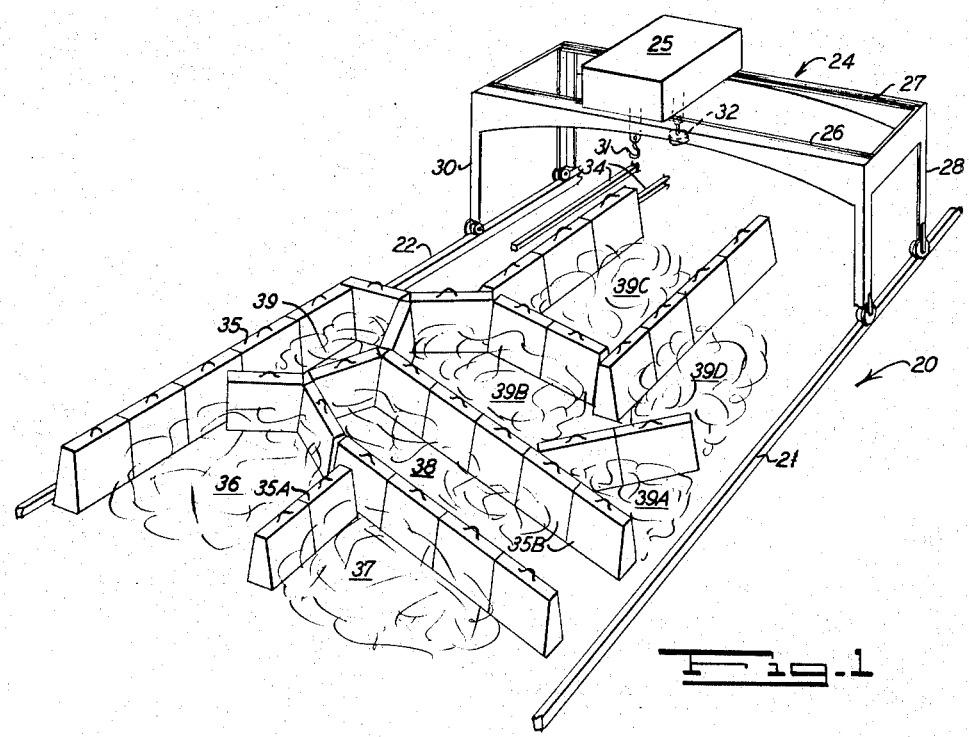
FIG. 1 is a perspective view of a steel scrap yard showing the use of dividers in accordance with the invention to provide a plurality of various shaped areas to receive the scrap steel.

Referring now to FIG. 1, a scrap yard designated generally by reference numeral 20 is bounded on two sides by a pair of parallel tracks 21 and 22 which carry a gantry 24 mounting a traveling crane or winch 25. The latter is supported by the parallel runners 26 and 27 which in turn are carried by a pair of trestles or side frames 28 and 30 which run on the parallel tracks 21 and 22. The traveling crane 25 includes a hoisting block 31 and an electromagnet 32 or hook. Railroad tracks 34 are disposed under the gantry 24 and lead to nearby furnaces wherein scrap steel loaded on cars carried by said tracks can readily be charged into said furnaces. A plurality of concrete barriers 35, 35A and 35B are placed in the yard 20 by the hoisting block 31 in positions as desired to accommodate the various piles of steel 36, 37, 38, 39, 39A, 39B, 39C and 39D carried within the various divisions bounded by the barriers 35. In the event that a large tonnage of a steel having a gradation such as that contained within the area 37 is received, it is a simple matter to move the barriers 35A or 35B to enlarge the area containing steel 37—say bushelings, whereby one or both of the areas containing steel 36— say No. 2 bundles, or steel 38—say steelturnings, as desired, may be reduced by a like amount. Because of the weight and mass of the dividers 35, 35A and 35B, when they are lifted only a short way off the ground by the hoisting block 31 and moved against the scrap such as scrap 36, the barriers push the scrap in front of them and thereby maintain the scrap in a segregated condition while still obtaining the maximum use of the effective capacity of the yard 20.

Figure 2:
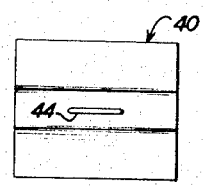
FIG. 2 is a top view of a divider block in accordance with the invention.
Figure 3:
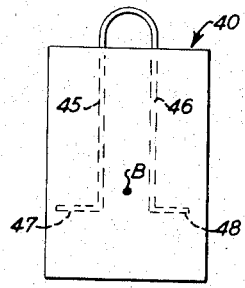
FIG. 3 is a front elevation of the divider blocks shown in FIG. 2.
Figure 4:
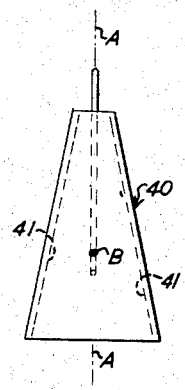
FIG. 4 is a side elevation of the divider block shown in FIG. 2.

FIGURES 2 to 4 show a concrete divider 40 which may be employed pursuant to the inventive concept of this application. This concrete block is approximately eight feet tall, five and three-quarters foot wide in its front elevation, and five feet thick at its lower aspect tapering in a uniform manner towards the top where it is about one and one half feet thick. Approximately five and one half cubic yards of concrete are contained in block 40 and its total weight is approximately 11 tons. About four inches from the face there is a wire mesh reinforcement designated in FIGURE 4 as 41. The center of gravity of the divider 40 is centered within a vertical plane A shown in FIGURE 3 at about 40% of the height of the divider 40 measured from its bottom. This places the center of gravity approximately at point B as shown in FIGURES 2 and 3. The lifting means for the divider 40 comprises an inverted U-shaped rod 44 which was inserted in the concrete of divider 40 when it was poured so as to lie within plane A and to straddle in its lower portion the center of gravity B. Rod 44 includes on each of its legs 45 and 46 two extensions or feet 47 and 48 extending normally from the respective legs 45 and 46, but still aligned within the plane A.

Figure 5:
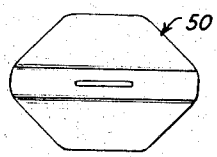
FIG. 5 is a top view of a further divider block in accordance with the invention.
Figure 6:
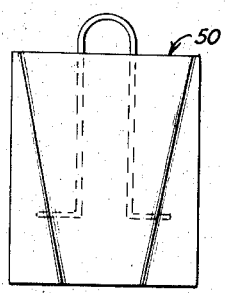
FIG. 6 is a front elevation of the divider block shown in FIG. 5.
Figure 7:
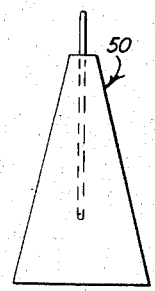
FIG. 7 is a side elevation of the divider block shown in FIG. 5.

FIGURES 5 to 7 disclose a modified version 50 of the divider in accordance with the inventive concept of this application. From the top view 7, it will be noted that there are no sharp corners on this divider and the divider has from the top the shape, more or less, of an equal angular hexagon with two opposite sides which form the faces of the divider 50 longer than the remaining four sides. Although the divider 50 tapers from the bottom to the top in a manner similar to divider 40, it is to be noted that at all horizontal cross-sections it remains an equal-angular hexagon. This design permits the use of the divider 50 to be placed together with another such divider in a plurality of angular relationships without creating a crack in the upper aspect of a barrier formed by several of the dividers. However, because of the shape of the divider, it is more difficult to mold. In order to keep the center of gravity at the required depth, the divider 50 is constructed a few inches wider at the bottom and a few inches narrower at the top than divider 40.

Figure 8:
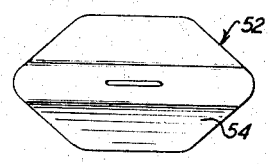
FIG. 8 is a top view of a still further divider block in accordance with the invention.
Figure 9:
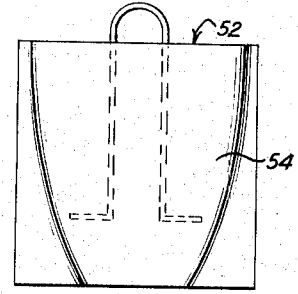
FIG. 9 is a front elevation of the divider block shown in FIG. 8.
Figure 10:
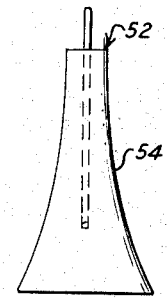
FIG. 10 is a side elevation of the divider block shown in FIG. 8.

FIGURES 8 to 10 show an embodiment similar to that shown in FIGURES 5 to 7 except that the upstanding front sides 54 are curved inwardly or concave rather than straight as shown in the preceding embodiment. This construction permits a still lower center of gravity and a somewhat greater height for divider 52. But it will be appreciated that the further curvature on the side 54 renders the construction of this particular embodiment somewhat more difficult than those of the preceding embodiments.

FIGURE 12 shows in diagrammatical form the reaction of forces thought to exist when the barrier has a large amount of steel disposed on one of its sides and very little, if any, on the other side. The lateral resultant force from the steel is considered to act in the direction of the arrow 56 whereby the resultant downward force in the direction of vector 53 from the weight of the divider 57 and the lateral force exerted from the steel 55 reacts at point 58. It has been noted in practice that with dividers constructed in accordance with the invention, steel can be piled to the top of the divider on one side with little or no steel on the other side without the divider being turned over due to the force of the steel. When additional steel of substantial weight is dropped onto the pile such as a pile 55, the divider which retains said steel such as divider 57 will tend to shake. However, there has been no instance where the divider has been displaced where it was placed upon reasonably level ground to start with.

FIGURE 11 discloses the incorporation of a short wire mesh fence extending from the top of a divider 60. The mesh 59 extends above the divider 60 approximately fifteen inches to a horizontal bar 61 to which it is secured. The mesh 59 is embedded for about six inches within the top of the divider 60. The horizontal rod 61 is welded to and integral with the upper portion of the inverted U-shaped lifting rod 62. Also welded to the horizontal rod 61 are two vertical bars 64 and 65 which extend downwardly into the concrete and are within the same vertical central plane as lifting rod 62. Diagonal truss members 66, 67, 68, and 69 are welded as shown to rod 62, bar 61 and the vertical rods 64 and 65. This arrangement serves a double purpose of extending the effective height of the divider 60 and bracing the lifting rod 62 against lateral displacement.

FIGURE 13 discloses a typical layout of scrap storage and segregation employing the invention which is used in connection with an electric furnace. Various types of scrap have been identified and include nickel bundles, 20% nickel clad, bushelings, No. 1 heavy melting bundles, No. 1 heavy melting special low copper scrap, No. 1 heavy melting low copper scrap, broken molds, low copper plate, etc. The various numbers identify home generated scrap according to a system utilized to cover various alloy combinations. Concrete dividers such as divider 40 are used in this yard 70. When required to adjust the capacities of the various spaces, they may be moved longitudinally with respect to the yard by a crane 71 traveling on the adjacent tracks 77 or by a gantry rig 72 which straddles the main portion 70A of the yard 70. Railroad cars 73, employed to carry scrap to and from the yard portion 70A, may be aligned with the area with which the scrap is transferred from the cars to the yard or vice versa.

The foregoing detailed description has been given for clearness of understanding only, and no unnecessary limitation should be understood therefrom, for modifications will be obvious to those skilled in the art to which the invention relates.

I claim:

1. For use in the process of making variable divided areas for the segregation of scrap metal according to gradation in a scrap metal yard, a movable divider which comprises a solid concrete block which is substantially rectangular in front elevation and of greater thickness in its lower aspect than in its upper aspect, said lower base thickness being at least sixty percent of the height of said block, the front and back sides of said block converging gradually from the bottom to the top of said block at an angle substantially in excess of 60° from the horizontal, the center of gravity of said block lying in a vertical plane intersecting said block through its geometric center longitudinally within substantially the lower forty percent of said block's height, and lifting means of inverted U-shaped configuration extending vertically out of the top of said concrete block.

2. For use in the process of making variable divided areas for the segregation of scrap metal according to gradation in a scrap metal yard, a movable divider which comprises a solid block composed of material having a density of approximately two tons per cubic yard, said block being substantially rectangular in its front elevation and of greater thickness in its lower aspect than in its upper aspect, said lower thickness being at least sixty percent of the height of said block, the front and back sides of said block converging gradually from the bottom to the top of said block at an angle substantially in excess of 60° from the horizontal, the center of gravity of said block lying in a vertical plane intersecting said block through its geometric center longitudinally and within substantially the lower forty percent of said block's height, and lifting means extending vertically out of the top of said block, said lifting means being connected to further rod means embedded within said block.

3. For use in the process of making variable divided areas for the segregation of scrap metal according to gradation in a scrap metal yard, a movable divider which comprises a solid concrete block which is substantially rectangular in its front elevation and of greater thickness in its lower aspect than in its upper aspect, the center of gravity of said block lying in a vertical plane intersecting said block through its geometric center longitudinally and being within substantially the lower forty percent of said block's height, the front and back sides of said block converging gradually from the bottom to the top of said block at about 75° from the horizontal, and lifting means of inverted U-shaped configuration extending vertically out of the top of said concrete block, said lifting means extending to below said block's center of gravity.

4. For use in the process of making variable divided areas for the segregation of scrap metal according to gradation in a scrap metal yard, a movable divider which comprises a solid concrete block which is substantially rectangular in front elevation and of greater thickness in its lower aspect than in its upper aspect, said block being flat on the bottom, the front and back sides of said block converging gradually from the bottom to the top of said block at an average angle substantially over 60° relative to its bottom, the center of gravity of said block lying in a vertical plane intersecting said block through its geometric center longitudinally and being within substantially the lower forty percent of said block's height, and lifting means of inverted U-shaped configuration extending vertically out of the top of said concrete block, said lifting means lying within the aforesaid vertical plane and extending downwardly and being embedded in said block to beyond the center of gravity of said block whereupon said lifting means includes end parts which extend horizontally from the end portion thereof.

5. For use in the process of making variable divided areas for the segregation of scrap metal according to gradation in a scrap metal yard, a movable divider which comprises a solid concrete block composed of approximately five and one half cubic yards of concrete approximately eleven tons in weight, said block being substantially rectangular in front elevation and of greater thickness in its lower aspect than in its upper aspect, said lower thickness being at least sixty percent of the height of said block, the front and back sides of said block converging gradually from the bottom to the top of said block, the center of gravity of said block lying in a vertical plane at an angle substantially greater than 60°, intersecting said block through its geometric center longitudinally and being within substantially the lower forty percent of said block's height, and lifting means extending vertically out of the center of the top of said concrete block, said lifting means including a portion embedded in said concrete block through substantially the center of gravity of said block.

6. A variable yard for steel scrap comprising a substantially flat ground area, parallel rails extending on each side of said yard, crane means disposed over said yard and movable longitudinally with respect thereto, a plurality of solid concrete blocks dividing said yard into segregated areas, each of said blocks being substantially rectangular in elevation and of greater thickness in its lower aspect than its upper aspect, the front and back sides of said block converging gradually from the bottom to the top of said block at an angle substantially in excess of 60° relative to the ground area, the center of gravity of each of said blocks lying in a vertical plane intersecting the said block through its geometric center longitudinally and being within substantially the lower forty percent of said block's height, and liftnig means adapted to receive a hoisting block from said crane means extending vertically out of the top of each of said blocks.

7. A solid concrete block for use in the process of making variable divided areas for segregation of scrap metal according to gradation in a scrap metal yard which is substantially rectangular in front elevation and of greater thickness in its lower aspect than in its upper aspect, the center of gravity of said block lying in a vertical plane intersecting said block through its geometric center longitudinally and being within substantially the lower forty percent of said block's height, said block being an equal-angular hexagon in horizontal cross section substantially throughout, the front and back sides of said block converging gradually from the bottom to the top of said block with an average angle relative to the horizontal of substantially more than 60°, and lifting means extending vertically out of the top of said block's top.

8. A concrete block in accordance with claim 7 wherein the front and back sides have a relatively small degree of inward bow.

9. For use in the process of making variable divided areas for the segregation of scrap metal according to gradation in a scrap metal yard, a movable divider which comprises a solid concrete block which is substantially rectangular in front elevation and of greater thickness in its lower aspect than in its upper aspect, said lower thickness being at least sixty percent of the height of said block, the front and back sides of said block converging gradually from the bottom to the top of said block at an angle of about 75° from the horizontal, the center of gravity of said block lying within a vertical plane intersecting said block through its geometric center longitudinally and being within substantially the lower forty percent of said block's height, lifting means of inverted U-shaped configuration extending vertically out of the top of said concrete block, and a fence including truss members connected to said lifting means and providing a lateral barrier extending along the top of said block.

10. A movable divider comprising a solid concrete block having a base, a top and at least two pairs of opposing sides, one pair of opposing sides of said block gradually converging towards one another from said base towards said top of said block at an angle of substantially greater than 60° relative to the horizontal, the other pair of opposing sides being substantially vertical so that the block is substantially rectangular in front elevation, the width of the base being at least sixty percent of the height of said block, the center of gravity of said block lying in a vertical plane intersecting said block through its geometric center longitudinally within substantially the lower forty percent of said block's height, and lifting means of inverted U-shaped configuration extending vertically out of the top of said concrete block.

11. A movable divider comprising a solid concrete block, a base, a top and three pairs of opposing sides, one pair of opposing sides of said block gradually converging towards one another from said base towards said top of said block at an angle substantially greater than 60° relative to the horizontal and being longer than the remaining two pairs of sides, the horizontal cross section of said block comprising an equal-angular hexagon whereby said divider can be closely interfitted with other similar dividers in a plurality of angular relationships, the width of the base being at least sixty percent of the height of said block, the center of gravity of said block lying in a vertical plane intersecting said block through its geometric center longitudinally within substantially the lower forty percent of said block's height, and lifting means of inverted U-shaped configuration extending vertically out of the top of said concrete block.

12. A divided yard with variable segregated areas for steel scrap comprising a substantially flat ground area, parallel rails extending on each side of said yard, a gantry carried by said rails, said gantry disposed transversely over said yard and movable longitudinally with respect thereto, crane means carried by said gantry, said crane means including a hoisting block, a plurality of dividers dividing said yard into said segregated areas, each of said dividers comprising a heavy solid concrete block having a base, a top and at least two pairs of opposing sides, at least one of said pairs of opposing sides located to engage scrap steel contained in said segregated areas, the steel scrap engaging a pair of said opposing sides of said block gradually converging throughout their length towards one another from said base towards said top of said block at angles substantially greater than 60° from the horizontal, the other pair of opposing sides of said block being substantially vertical so that said block is substantially rectangular in front elevation, the width of the base being at least sixty percent of the height of said block, the center of gravity of said block lying in a vertical plane intersecting said block through its geometric center longitudinally with substantially the lower forty percent of said block's height, steel rod lifting means of inverted U-shaped configuration extending vertically out of the top of said concrete block, said lifting means lying within the aforesaid vertical plane and extending downward and being embedded in said block to beyond the center of gravity of said block whereupon said lifting means includes end parts which extend horizontally in said block, said lifting means adapted to receive in its upper portion said hoisting block, whereby said dividers are movable by said crane means not withstanding the presence of scrap steel in contact with said dividers being moved.

13. Structure in accordance with claim 12 wherein said block is in side elevation about eight feet tall and about five feet wide at its base and between about one and two feet wide on its top.

References Cited

UNITED STATES PATENTS

| 954,283 | 5/1910 | Hawkes | 61—4 |
| 1,012,868 | 12/1911 | Laney | 256—19 |
| 1,812,300 | 6/1931 | Leeds et al. | 61—4 |

FOREIGN PATENTS

| 712,706 | 7/1931 | France. |
| 1,265,499 | 5/1961 | France. |
| 861,018 | 12/1952 | Germany. |
| 273,612 | 7/1927 | Great Britain. |
| 333,943 | 8/1930 | Great Britain. |

GERALD M. FORLENZA, *Primary Examiner.*

MARVIN A. CHAMPION, *Examiner.*

GEORGE F. ABRAHAM, *Assistant Examiner.*